United States Patent [19]

Mountford

[11] 4,071,266
[45] Jan. 31, 1978

[54] ADJUSTABLE DROP NIPPLE

[75] Inventor: George S. Mountford, Chippewa Lake, Ohio

[73] Assignee: A-T-O Inc., Willoughby, Ohio

[21] Appl. No.: 737,499

[22] Filed: Nov. 1, 1976

[51] Int. Cl.² ............................................. F16L 27/12
[52] U.S. Cl. .................................... 285/14; 239/209; 285/45; 285/302
[58] Field of Search .................... 285/302, 45, 13, 14, 285/115; 239/209

[56] References Cited

U.S. PATENT DOCUMENTS

| 2,700,370 | 1/1955 | Goff | 285/302 X |
|---|---|---|---|
| 2,931,669 | 4/1960 | McDonald | 285/45 |
| 3,451,483 | 6/1969 | Van Houtte et al. | 285/302 X |
| 3,675,952 | 7/1972 | Mears | 285/302 |
| 3,770,303 | 11/1973 | Hallett | 285/45 |
| 3,783,178 | 1/1974 | Philibert et al. | 285/302 X |
| 3,807,503 | 4/1974 | Iasillo | 285/302 X |
| 4,007,877 | 2/1977 | Jackson | 285/302 X |

Primary Examiner—Thomas F. Callaghan
Attorney, Agent, or Firm—Webster B. Harpman

[57] ABSTRACT

An adjustable drop nipple is disclosed for connecting a pendant sprinkler to a sprinkler system. The nipple includes outer and inner telescoped pipes with a gripping means therebetween which permits an adjustment of the telescoped relation of the pipes for a desired position of the pendant sprinkler below a drop ceiling.

10 Claims, 2 Drawing Figures

ADJUSTABLE DROP NIPPLE

BACKGROUND OF THE INVENTION

1. Field of the Invention

This invention relates to adjustable drop nipples as employed to adjustably position sprinklers relative to the distribution piping of a sprinkler system and a drop ceiling.

2. Description of the Prior Art

Prior devices of this type have employed various arrangements of fittings and nipples with various rotational locks for securing the fittings and nipples in desired telescopic relation. See for example U.S. Pat. Nos. 1,833,040, 3,084,869, 3,194,316, 3,451,483, 3,675,952, 3,807,503, and 3,847,392.

This invention provides a simple, easily adjustable device and insures against the accidental blocking of the distribution piping by parts of the adjustable nipple.

SUMMARY OF THE INVENTION

An adjustable drop nipple includes a sealing coupling engaged on a fixed nipple in a sprinkler system and a rotational lock for securing a telescopically arranged tube relative thereto. A sprinkler is positioned in one end of the telescopically arranged tube and a sleeve on the sealing coupling prevents undesirable longitudinal movement of the telescopically arranged tube into the distributing pipe. The rotational lock secures the telescopically adjustable tube and the sprinkler thereon in desirable adjusted relation to the fixed nipple and sealing coupling.

DESCRIPTION OF THE PREFERRED EMBODIMENT

Figure 1:
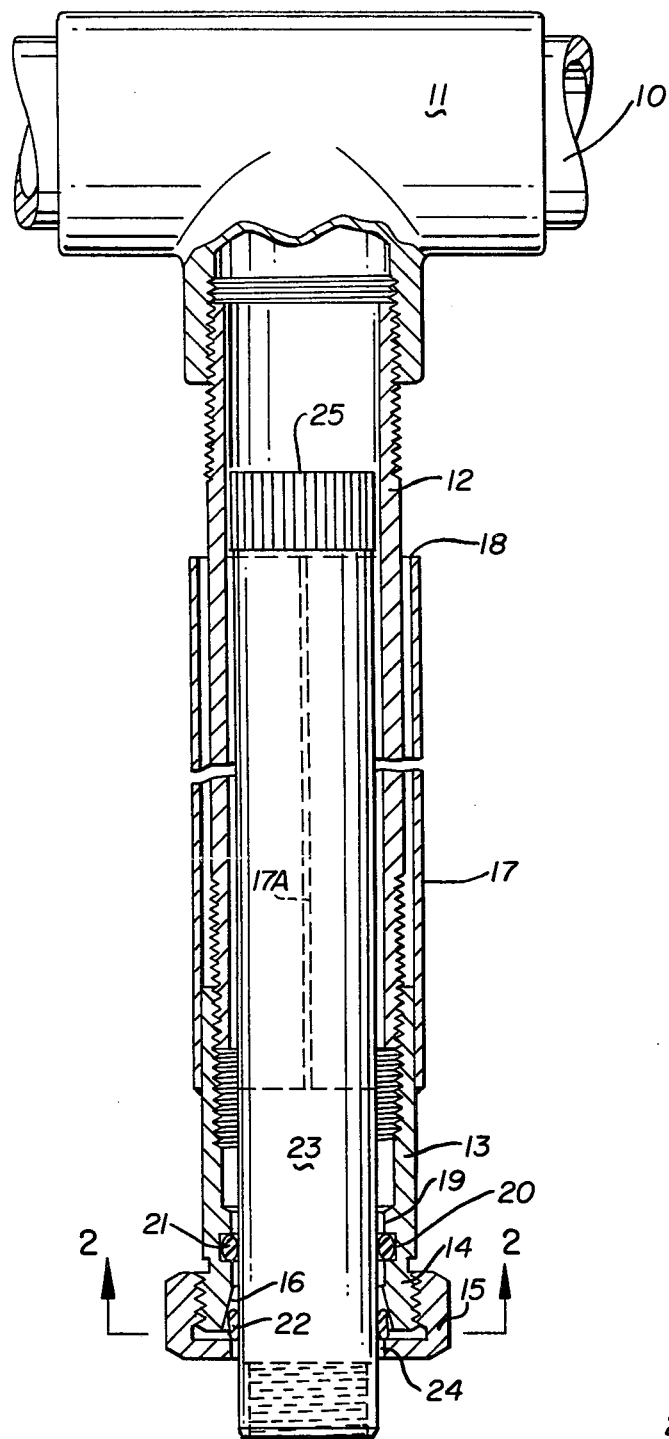
FIG. 1 is a sectional elevation through an adjustable drop nipple illustrating the same in communication with a distributing pipe.
Figure 2:
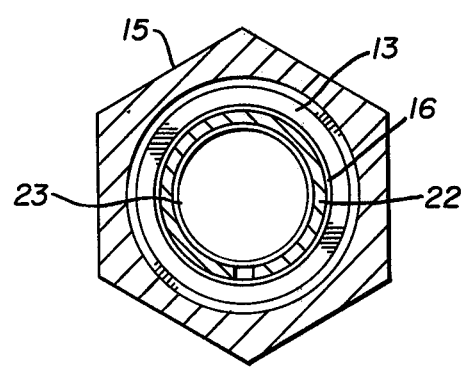
FIG. 2 is a horizontal section on line 2—2 of FIG. 1.

By referring to FIG. 1 of the drawings, a preferred embodiment of the invention may be seen and wherein a distributing pipe 10, as for example that of a fire extinguishing sprinkler system, has a T 11 and a fixed standard nipple 12 of a known minimum length engaged in the T 11 in depending relation thereto. The lower end of the fixed nipple 12 is threadably engaged in the uppermost portion of a sealing coupling 13, the lower end 14 of which is externally threaded so as to receive an apertured nut 15 which is preferably hexagonal. The inner lower end of the sealing coupling 13 is tapered as at 16 so that in effect it flares outwardly toward the external threads and the outer end of the sealing coupling 13.

A sleeve 17 split longitudinally to form an elongated aperture 17A is tack welded to the outer upper surface of the sealing coupling 13 and extends upwardly therebeyond to an uppermost end 18. The arrangement is such that the total length of the split sleeve 17 and the sealing coupling 13 is substantially the same as the minimum length of the fixed nipple 12.

Still referring to FIG. 1 of the drawings, it will be seen that an annular rib 19 is formed on the inner surface of the sealing coupling 13 inwardly of the lower end thereof and that immediately below the annular rib 19 an annular channel 20 is formed in the inner surface of the sealing coupling 13. An O-ring 21 is positioned in the annular channel 20 and a split metal ring 22 is positioned within the nut 15 and adjacent the tapered inner surface 16 of the sealing coupling 13.

A tube 23 is telescopically positioned partially within the fixed nipple 12 and extending through the sealing coupling 13 and through the aperture 24 in the nut 15. The upper end of the tube 23 has a heavy straight knurl 25 formed on the exterior thereof so as to increase the effective diameter thereof at this point and the lower or opposite end of the tube 23 is internally threaded so that a fire extinguishing sprinkler can be threadably engaged therein.

It will thus be seen that the adjustable tube 23 extends through and engages the O-ring 21 to form a fluid tight seal between its exterior and the interior of the sealing coupling 13 and through the split ring 22. The arrangement is such, that when the nut 15 is rotated on the externally threaded end 14 of the sealing coupling 13 so that it moves inwardly thereof, it will move the split ring 22 against the tapered surface 16 in the lower end of the sealing coupling 13 is a wedging action which will lock the adjustable tube 23 in desired adjusted relation thereto.

Still referring to FIG. 1 of the drawings, it will be seen that the fixed nipple 12 must have a minimum length of, for example, six inches, and that the overall combined length of the sealing coupling 13 and the split sleeve 17 is substantially the same. The adjustable tube 23 is, for example, approximately six and one-half inches in length and it will occur to those skilled in the art that the length of the split sleeve 17 is such that when the adjustable drop nipple is mounted as close to the T 11 as possible and when the tube 23 is telescoped as far into the sealing coupling 13 as possible, the upper end of the adjustable tube 23 will not extend into the water way of the distributing pipe 10. In the event a shorter fixed nipple 12 is substituted in the assembly the arrangement is such that the upper end 18 of the split sleeve 17 will engage the T 11 before the upper end of the adjustable tube 23 can move into the T 11 or the waterway of the distributing pipe 10.

As hereinbefore described the loosening of the apertured nut 15 permits the adjustable tube 23 to be moved longitudinally of the sealing coupling 13 so as to position a sprinkler engaged in the outer end of the tube 23 in desired relation to the distributing piping 10 and for example a ceiling suspended therebelow.

The split 17A in the sleeve 17 permits immediate drainage of water if the connection between the fixed nipple 12 and the sealing coupling 13 leaks at the time of installation or adjustment. The entire sleeve 17 does not have to fill with water before a leak can be observed.

The adjustable drop nipple thus provides satisfactory adjustment and incorporates a safety factor in preventing blocking of the distributing piping as aforesaid. Additionally the device permits adjustment as to length without leakage of water and eliminates the heretofore necessary draining of the piping system and saves the labor in connection therewith.

Although but one embodiment of the present invention has been illustrated and described, it will be apparent to those skilled in the art that various changes and modifications may be made therein without departing from the spirit of the invention and having thus described my invention what I claim is:

1. An adjustable drop nipple for a fire extinguishing sprinkler system to connect a sprinkler at the underside of a room ceiling with a nipple in water distributing piping above the room ceiling, said adjustable drop nipple comprising a sealing coupling having one end engaging said nipple, an elongated sleeve on the exterior of said sealing coupling extending toward said distributing piping and partially overlying said nipple, a tube telescopically arranged in said sealing coupling and nipple and extending outwardly of the other end of said sealing coupling, a tapered surface formed in said sealing coupling with the largest diameter of said tapered surface being adjacent said other end thereof, a rotatable lock nut on said sealing coupling through which said tube extends and enclosing a split ring movable toward and away from said tapered surface upon rotation of said rotatable lock nut, said split ring arranged for wedging action between said tube and said tapered surface of said coupling and resilient seal means in said sealing coupling engaging said tube and spaced with respect to said tapered surface and said split ring.

2. The adjustable drop nipple set forth in claim 1 and wherein the distributing piping includes a fitting and the nipple is engaged therein.

3. The adjustable drop nipple set forth in claim 1 and wherein the tube is of a known length and the overall length of the sealing coupling, the sleeve and minimum length of the nipple are substantially the same length as said tube.

4. The adjustable drop nipple set forth in claim 1 and wherein the sleeve on the exterior of the sealing coupling is apertured to permit drainage of water therefrom.

5. The adjustable drop nipple set forth in claim 1 and wherein an annular rib is formed on the inner surface of the sealing coupling adjacent said resilient seal means therein.

6. The adjustable drop nipple set forth in claim 1 and wherein an annular channel is formed in the inner surface of said sealing coupling and said resilient seal means comprises an O-ring disposed in said channel.

7. The adjustable drop nipple set forth in claim 1 and wherein a thread pattern is formed within the outer end of said tube and arranged to receive a sprinkler.

8. The adjustable drop nipple set forth in claim 5 and wherein the inner end of said tube is enlarged so as to form means engagable with said annular rib in said sealing coupling to prevent passage thereby upon release of said rotatable lock.

9. The adjustable drop nipple set forth in claim 8 and wherein said enlargement comprises a heavy knurl formed circumferentially of said tube.

10. The adjustable drop nipple set forth in claim 8 and wherein said rotatable lock comprises a nut having an inwardly extending annular collar defining the aperture therethrough and acting to cage said split ring.

* * * * *